United States Patent
Rogut

(10) Patent No.: US 7,316,365 B2
(45) Date of Patent: Jan. 8, 2008

(54) METHOD OF INTEGRATED PROCESSING OF WASTE MATERIALS

(75) Inventor: Stanislaw Rogut, Pyrzyce (PL)

(73) Assignee: Multichem EKO SP. ZO.O., Pyrzyce (PL)

( * ) Notice: Subject to any disclaimer, the term of this patent is extended or adjusted under 35 U.S.C. 154(b) by 117 days.

(21) Appl. No.: 11/277,251

(22) Filed: Mar. 23, 2006

(65) Prior Publication Data

US 2006/0214038 A1   Sep. 28, 2006

(30) Foreign Application Priority Data

Mar. 25, 2005  (PL) .................................... 373934

(51) Int. Cl.
*B02C 19/00* (2006.01)

(52) U.S. Cl. ........................ 241/22; 241/23; 241/101.8

(58) Field of Classification Search ................... 241/21, 241/22, 23, 25, 101.8
See application file for complete search history.

(56) References Cited

U.S. PATENT DOCUMENTS

| | | | | |
|---|---|---|---|---|
| 4,941,772 A | * | 7/1990 | Roesky et al. | 405/129.15 |
| 6,945,181 B2 | * | 9/2005 | Tanner | 110/348 |
| 2006/0058403 A1 | * | 3/2006 | Rogut et al. | 521/40 |

* cited by examiner

*Primary Examiner*—Mark Rosenbaum
(74) *Attorney, Agent, or Firm*—Matthias Scholl P.C.; Matthias Scholl

(57) ABSTRACT

Taught herein are methods of integrated material processing, especially integrated processing of waste materials. According to the methods, waste materials are exposed simultaneously to two or more unit operations, and the physical phenomena associated with each of the unit operations act in concert to achieve a desired processing objective.

20 Claims, No Drawings

METHOD OF INTEGRATED PROCESSING OF WASTE MATERIALS

CROSS-REFERENCE TO RELATED APPLICATIONS

This application claims priority to the Polish Patent Application No. P-373934, filed Mar. 25, 2005, the contents of which are incorporated herein by reference.

BACKGROUND OF THE INVENTION

1. Field of the Invention

The subject matter of the invention are methods of integrated processing of materials, and especially of integrated processing of waste materials.

2. Brief Description of the Background of the Invention Including Prior Art

Known methods of waste material processing include sterilizing waste with chemical agents (e.g., strong acids or bases), physical agents (e.g., high temperature, high pressure, ultrasonic waves, or microwaves), or biological agents (e.g., fermentation bacteria). These processing methods are applicable to such waste materials as sewage sediments, biomass, biological waste, animal slaughter waste, and animal food processing waste. The most common output forms of waste are watery sludge and paste, both of which are mixtures of various solids and liquids. In most cases during storage and processing, waste materials emit repugnant odors in the form gases and aerosols which are very burdensome for the environment and its inhabitants.

Current processing methods of waste materials comprise processing and utilizing of the waste materials in multistage technological processes consisting of series of unit operations, including breaking-up, chemical processing, thermal processing, milling, and cooling, in the same or in different order and in various operational configurations.

The basic disadvantage of utilizing multistage technological processes is that in each of the separate unit operations only those physical phenomena associated with the particular unit operation are exploited and others are neglected. Specifically, while the braking-up of waste products utilizes kinetic energy of milling, it does not at the same time exploit the advantages of utilizing thermal energy. Similarly in chemical unit operations, while emphasis is placed on efficiency of the chemical process, other operational aspects, such as the amount of heat emitted, or the change in the physical structure of the products are neglected.

An example of a unit operation, in which emphasis is placed only on a particular phenomenon associated with that unit operation, is the sanitation of sewage waste with ground bunt lime. In this unit operation only the chemical sterilization abilities are used. Another example is the drying of sewage waste with heat energy emitted during the milling process. In this unit operation, the milling devices, such as ball mills, rod mills, chainsaw mills, solve the problem of grinding and drying. The milling is done, however, at the price of high energy consumption. These examples are not economical because of the necessity to invest up-front in expensive energy supply systems and high operational costs.

BRIEF DESCRIPTION OF THE INVENTION

The invention described herein provides a method of integrated processing of materials, and especially waste materials. According to the invention described herein, waste materials are exposed simultaneously to two or more unit operations and the physical phenomena associated with each of the unit operations act in concert to achieve the desired objective.

In certain embodiments of the present invention waste materials are treated with reactants and are then fed into a mill, in which they are milled. In certain embodiments of the present invention waste materials are treated with reactants of high reactivity inside a mill, in which they are milled. The heat of hydration of reactants and the heat produced through the conversion of kinetic energy of the grinding media into thermal energy bring the reaction mixture containing waste materials to boiling forcing an intensive evaporation of moisture.

In certain embodiments of the invention described herein, the thermal effects associated with the mechanical breaking-up of the material speed up the chemical reaction which the waste materials undergo in the mill, and, simultaneously, the change in physical structure of the product resulting from a chemical reaction intensifies the breaking-up and heat emitting processes.

An unexpected result of the inventive method is that the thermal energy and the heat of reaction (produced during the breaking-up and milling of waste) are released simultaneously inside the processed mixture causing most of the thermal energy generated to be used for simultaneous drying, sterilizing and grinding of the product. Specifically, the drying, sterilizing and grinding of a product occurring simultaneously is facilitated not only by the kinetic energy of milling, but also by the thermal energy of the reaction between waste materials and reactants.

In certain aspect of the present invention provided are methods of integrated waste material processing comprising: (a) mixing of a waste material(s) with a reactant able to undergo an exothermic hydration reaction with said waste material(s), wherein said mixing results in an intermediate comprising from about 5% to about 50% by weight of hydrated reactant, from about 2% to about 20% by weight of unreacted reactant, from about 5% to about 60% by weight of solid matters, and from at most about 5% to at most about 90% by weight of water; and (b) milling said intermediate in a mill; wherein during said milling the temperature of said intermediate rises and an evaporation of water contained in said intermediate occurs.

In certain embodiments, an intermediate comprises about 20% by weight of hydrated reactant, about 5% by weight of unreacted reactant, about 20% by weight of solid matters, and up to 50% of water.

In certain embodiments of the present invention, methods of integrated waste material processing comprise: (a) mixing of a waste material(s) with burnt lime, wherein said mixing results in an intermediate comprising from about 5% to about 50% by weight of lime hydrate, from about 2% to about 20% by weight of calcium oxide, from about 5% to about 60% by weight of solid matters, and from at most about 5% to at most about 90% by weight of water; and (b) milling said intermediate in a mill; wherein during said milling the temperature of said intermediate rises and an evaporation of water contained in said intermediate occurs.

In certain embodiments, an intermediate comprises about 20% by weight of lime hydrate, about 5% by weight of calcium oxide, about 20% by weight of solid matters, and up to 50% of water.

In certain embodiments of the present invention, the waste materials are selected from the group of communal waste; animal slaughter processing waste; animal food processing waste; petroleum waste; biomass; moisture-containing materials, such as, e.g., chalk, fertilizing lime, and other materials containing substantial amounts of water.

In certain embodiments of the present invention, at the time milling begins the intermediate has a temperature of from about 20° C. to about 90° C., and particularly about 60° C.

In certain embodiments of the present invention, waste materials are optionally condensed and/or preheated.

In certain embodiments of the present invention, reactants are selected from the group of unreacted burnt lime; and various other chemical substances able to emit the heat of hydration, such as, e.g., burnt dolomite, and anhydrous calcium chloride. In certain embodiments of the present invention reactants are used singularly or in mixtures. In certain embodiments of the present invention reactants are of high reactivity towards compounds contained in the waste materials and/or towards water.

In certain embodiments of the present invention, reactant(s) used in the process are in the form of pieces, pellets, or ground (i.e., powder).

In certain embodiments of the present invention, a mill is selected from the group of a ball mill, a rod mill, and a chainsaw mill.

In certain embodiments of the present invention, the grinding media is selected from the group of chainsaw chains, ball mill balls, and rod mill rods.

In certain embodiments of the present invention, the preparation of the material for milling and drying is done in a process generator constituting an integral part of the milling system.

In certain embodiments of the present invention, the contact of material with reactant(s), its milling, and drying is performed in a single device for executing all of the previously-identified unit operations, including (a) mixing of material(s) with reactant(s), (b) heating of the resulting reaction mixture (intermediate) with the heat produced from the ongoing chemical reaction, and (c) simultaneous evaporating of moisture contained in the material with the heat of chemical reaction and heat generated by transforming mechanical energy of milling parts into thermal energy.

In certain embodiments of the present invention, one or more of the following operations are performed in an integrated process reactor: (a) crushing of the reactant(s), (b) milling of the reactant(s), (c) contacting of the reactant(s) with the waste material(s), (d) reacting of the reactant(s) with the waste material(s), (e) drying of the resultant product, and (f) sterilizing of the resultant product.

In certain embodiments of the present invention, the materials being dried, milled and sterilized are of various kinds, and particularly communal wastes, animal slaughter processing waste, animal food processing waste, petroleum waste, biomass, moisture containing materials such as, e.g., chalk, fertilizing lime, and other materials containing substantial amounts of water.

In certain embodiments of the present invention, gaseous substances emitted from the reaction mixture (intermediate) during the integrated processing of materials are condensed and the heat of condensation is optionally used to heat the processed materials.

DESCRIPTION OF INVENTION AND PREFERRED EMBODIMENT

EXAMPLES

The methods according to the invention are explained more closely through the following non-limiting examples.

As exemplified below, several physical and chemical processes are simultaneously carried out in applied unit operations through the application of integrated transforming processes.

Example 1

Hot moist intermediate at 60° C. produced during the treatment of thickened warmed sewage waste with burnt lime of high reactivity, which intermediate contains 20% of lime hydrate, 5% unreacted calcium oxide, 20% solid matter coming from sewage sludge, and up to 50% of water, leaves a processing reactor and is fed with a conveyor through an inlet into a drying mill, particularly a ball mill, a rod mill, or a chainsaw mill, in which as a result of interaction with the grinding media, the damp and sticky grains of the intermediate are milled. The continually-evolving heat of hydration of non-processed burnt lime and the heat produced through the conversion of kinetic energy of chainsaw chains into thermal energy, bring the intermediate to boiling forcing intensive evaporation of moisture contained in the processed material. In certain embodiments of the invention described herein, the thermal effects associated with the mechanical breaking-up of the material speed up the chemical reaction and, simultaneously, the change in physical structure of the product resulting from a chemical reaction intensifies the breaking-up and heat emitting processes. An unexpected result of the inventive method is that the thermal energy and the heat of reaction (produced during the breaking-up and milling of waste) are emitted simultaneously inside the processed mixture causing most of the thermal energy generated to be used for drying, sterilizing and grinding of the product.

Example 2

The process is executed as in Example 1 with the difference that the preparation of the material for milling and drying is done in a process generator constituting an integral part of the milling system.

Example 3

The process is executed according to Example 1 or 2 with the difference that the contact of material with the reactant(s), its milling and drying is performed in a single device for executing all of the previously-identified unit operations, including (a) mixing of material with the reactant(s), (b) heating of the reaction mixture with the heat produced from the ongoing chemical reaction, and (c) simultaneous evaporating of moisture contained in the material with the heat of chemical reaction and heat generated by transforming mechanical energy of milling parts into thermal energy.

Example 4

The process is executed according to Example 1, 2 or 3 with the difference that the reactant(s) used in the process is in the form of pieces or pellets, and that one or more of the following operations are performed in an integrated process reactor: (a) crushing of the reactant(s), (b) milling of the reactant(s), (c) contacting of reactant(s) with the waste material, (d) reacting of reactant(s) with the waste material, (e) drying of the resultant product, and (f) sterilizing of the resultant product.

Example 5

The process is executed according to any one of the previous examples (1-4) but that the materials being dried, milled and sterilized are of various kinds, and particularly communal wastes, animal slaughter processing waste, animal food processing waste, petroleum waste, biomass, moisture containing materials such as, e.g., chalk, fertilizing lime, and other materials containing substantial amounts of water.

Example 6

The process is executed according to Examples 1, 2, 3, 4 or 5 with the difference that the reactant(s) used are various chemical substances able to emit the heat of hydration, such as, e.g., burnt dolomite, and anhydrous calcium chloride, both singularly or in mixtures, and both in pieces or ground.

Example 7

The process is executed according to previously given examples (1-6) with the difference that the heat of condensing gases emitted from the device is used to warm the processed materials.

Definitions

For convenience, certain terms employed in the specification, examples, and the appended claims are collected hereinbelow.

The term "lime," as used herein, includes "quicklime" and "hydrated lime". Specifically, the term "lime" refers to any combination of calcium oxide (CaO), calcium hydroxide ($Ca(OH)_2$), or a mixture thereof, with magnesium oxide (MgO), magnesium hydroxide ($Mg(OH)_2$), or a mixture thereof. Lime may also include such impurities as calcium carbonate ($CaCO_3$), aluminum oxide ($Al_2O_3$), ferric oxide ($Fe_2O_3$), silicon dioxide ($SiO_2$), sulfur trioxide ($SO_3$), sodium oxide ($Na_2O$), phosphorus pentoxide ($P_2O_5$), potassium oxide ($K_2O$), titanium dioxide ($TiO_2$), manganese oxide ($Mn_2O_3$), strontium oxide (SrO), and other organic and inorganic impurities, in various amounts.

The terms "burnt lime," "burned lime," "quicklime," and "oxide lime" as used herein, refer to any combination of calcium oxide (CaO) with magnesium oxide (MgO). Burnt lime may include such impurities as calcium carbonate ($CaCO_3$), calcium hydroxide ($Ca(OH)_2$), magnesium hydroxide ($Mg(OH)_2$), aluminum oxide ($Al_2O_3$), ferric oxide ($Fe_2O_3$), silicon dioxide ($SiO_2$), sulfur trioxide ($SO_3$), sodium oxide ($Na_2O$), phosphorus pentoxide ($P_2O_5$), potassium oxide ($K_2O$), titanium dioxide ($TiO_2$), manganese oxide ($Mn_2O_3$), strontium oxide (SrO), and other organic and inorganic impurities, in various amounts. Burnt lime used in embodiments of the invention, contains preferably a high ratio of calcium oxide with respect to the entire mixture, and particularly contains over 50% of calcium oxide, and more particularly over 60%, or 70%, or 80%, or 90%, or 95% of calcium oxide with respect to the entire mixture of compounds constituting burnt lime used.

Burnt lime is generally prepared by heating limestone to drive off carbon dioxide ($CO_2$). This changes the chemical form of the limestone from a carbonate to an oxide. Any hydrated lime in the limestone is also converted to calcium oxide by heating and driving off water. Burnt lime is sold in bags because of its powdery nature, unpleasant handling properties, and reactivity with moisture in air. It is a reactive and caustic material that produces heat when mixed with water. Thus, burnt lime must be handled carefully to avoid breathing the dust or contact with the skin and eyes.

The term "ground," as used herein and as applicable to lime and burnt lime ("ground lime", "ground burn lime"), refers to the particle size of lime or burnt lime. Specifically, "ground" as used herein means the particle size of burnt lime is smaller than 30 mm and particularly smaller than 20 mm, and more particularly smaller than 10 mm, or 5 mm, in diameter.

Particle size of ground lime or ground burnt lime, measured by standard size sieve mesh or directly in millimeters (mm), is one of the factors influencing the rate of reaction of lime with waste materials. The finer the grind, the more surface area is available to react with waste materials and the faster the reaction.

A 20-mesh sieve has 20 openings per linear inch or 400 openings per square inch, whereas 100-mesh sieve has 100 openings per linear inch or 10,000 openings per square inch. Burnt lime passing a 100-mesh sieve is smaller, has more surface area, and therefore reacts with waste material more rapidly than 20-mesh burnt lime.

The term "burnt dolomite," as used herein, refers to any combination of calcium oxide (CaO) with magnesium oxide (MgO). Burnt lime may include such impurities as calcium carbonate ($CaCO_3$), calcium hydroxide ($Ca(OH)_2$), magnesium hydroxide ($Mg(OH)_2$), aluminum oxide ($Al_2O_3$), ferric oxide ($Fe_2O_3$), silicon dioxide ($SiO_2$), sulfur trioxide ($SO_3$), sodium oxide ($Na_2O$), phosphorus pentoxide ($P_2O_5$), potassium oxide ($K_2O$), titanium dioxide ($TiO_2$), manganese oxide ($Mn_2O_3$), strontium oxide (SrO), and other organic and inorganic impurities, in various amounts. The term "screenings of burnt dolomite," as used herein, refers to burnt dolomite having particle sizes of 0-5 mm.

The term "phosphorite," as used herein, refers to a sedimentary rock containing phosphate minerals. Most commonly it is a bedded primary or reworked secondary marine rock composed of microcrystalline carbonate fluorapatite in the form of laminae; pellets; oolites; nodules; skeletal, shell, and bone fragments; and guano.

The term "apatite" as used herein, refers to a group of minerals with the group formula $Ca_5(PO_4)_3(F, Cl, OH)$. Individual apatite minerals are fluoroapatite ($Ca_5(PO_4)_3F$), chloroapatite ($Ca_5(PO_4)_3Cl$), and hydroxylapatite ($Ca_5(PO_4)_3OH$).

The term "hydration," as used herein, refers to the reaction of burnt lime with water. Specifically, water reacts with calcium oxide in an exothermic reaction to form calcium hydroxide. (However, magnesium oxide will not readily react with water at normal temperatures and pressures.) During the slaking of lime, large amounts of heat are given off which can significantly rise the temperature of a slurry.

The term "lime hydrate" refers to a product of the reaction of burnt lime with water, and includes calcium hydroxide ($Ca(OH)_2$).

The term "unreacted reactant," as used herein, refers to the amount of the reactant on a dry basis that has not reacted with the waste material and/or water contained therein and that is present in the intermediate or final product. The term "hydrated reactant," as used herein, refers to the amount of a chemical compound that has been formed upon the reaction of a waste material and/or water contained therein with a reactant and that is present in the intermediate or final product. For example, if the reactant is burnt lime, the unreacted reactant is burnt lime that has not reacted with the waste material and/or water contained therein; and hydrated reactant is hydrated lime that has been formed upon the reaction of a waste material and/or water contained therein with burnt lime.

The parameter "$t_{60}$," as used herein, refers to the amount of time needed for a reactant (e.g., ground burnt lime) to be heated from 20° C. to 60° C. when reacting with water. Therefore, $t_{60}$ is a measure of the reactivity of the reactant. Specifically, the lower the $t_{60}$ (i.e., the shorter the time for the temperature of the reactant to reach 60° C. when reacting with water), the higher the reactivity of the reactant (i.e., the greater its ability to generate the heat of hydration). The term "high reactivity" with respect to the reactant(s) used in the methods of the invention described herein refers to reactants having $t_{60}$ of lower than 10 minutes, and particularly lower than 4 minutes.

The term "heat of hydration" of a reactant, as used herein, refers to the quantity of heat (in Joules/gram of the reactant) liberated upon complete hydration of the reactant at a given temperature. For example, the heat of hydration of pure calcium oxide (CaO) is about 1186 J/g at normal temperatures and pressures. Of course, not all of the reactant used always hydrates and the degree of hydration of 100% may never be reached.

The term "high heat of hydration", as used herein, refers to heat of hydration liberated upon complete hydration of the reactant at normal temperature which is at least 400 J/g, and particularly at least 600 J/g, and more particularly at least 800 J/g, or 1000 J/g.

Other compounds which exhibit high heats of hydration include, for example, tricalcium silicate ($Ca_3SiO_5$)-517 J/g, tricalcium aluminate ($3CaO.Al_2O_3$)-1144 J/g, and tetracalcium aluminoferrite ($4CaO.Al_2O_3.Fe_2O_3$)-725 J/g.

The term "water binding capacity" ("WBC"), as used herein, refers to the largest quantity of water that the reactant is able to hold firmly. Firmly held water is not removed by filtration and centrifugation. Firmly held water is held either by covalent bonds with the reactant (e.g., calcium oxide and water yielding calcium hydroxide) or by non-covalent bonds and other weak forces, such as, for example, hydrogen bonds and hydrophilic attractions (e.g., starch and water yielding swollen starch). Specifically, when calcium oxide is allowed to react with water, a ton of calcium oxide would bind 320 liters of water. On the other hand, when potato starch is exposed to water at appropriate temperatures, it can bind as much as 1000 times its volume. Other superabsorbers which exhibit high water binding capacity include, for example, starch graft polymers (see U.S. Pat. No. 6,897,358) which can absorb 1000 g of water per one gram of polymer, and sodium polyacrylate, which can absorb as much as 400-800 times its mass in water.

The term "high water binding capacity," as used herein refers to water binding capacity of at least 0.2 g of water per every g of reactant.

"Having water content of n %," as used herein, refers to the weight ratio of water contained in the waste material. For example, if a waste material has a water content of 20% that means that for every 100 kg of waste material, the waste material contains 20 kg of water and 80 kg of other compounds.

The term "by weight" or "w/w" relates herein to the weight of an individual part relative to the weight of the entire mixture. For example, a mixture containing 20% of part A by weight and 30% of part B by weight contains 20 kg of part A for every 100 kg of the mixture and 30 kg of part B for every 100 kg of the mixture.

The term "unit operation," as used herein, refers to a basic step in a process. For example in milk processing, homogenization, pasteurization, chilling, and packaging are each unit operations which are connected to create the overall process. A process may have many unit operations to obtain the desired product. With respect to waste material processing, "unit operation" means a definable segment of an overall process for producing a processed waste material, and includes sterilization, mechanical separations, size reduction, mixing, drying, evaporation, and others.

The term "solid matters" as used herein refers to the amount of waste material(s) and/or processed waste material(s) only on a dry basis, i.e., excluding any water. The term "solid matters" includes waste material(s) and/or processed waste material(s) only and does not include the reactants (whether reacted or unreacted), i.e., e.g., burnt lime, hydrated lime, burnt dolomite, phosphorite, apatite, etc.

As used herein in connection with a measured quantity, the term "about" indicates that variation in the measured quantity as would be expected by the skilled artisan making the measurement or determination and exercising a level of care commensurate with the objective of the measurement and the precision of the measuring apparatus being used.

The term "mill" refers to a unit operation designed to break a solid material into smaller pieces. There are many different types of mills including ball mills, rod mills, chainsaw mills, disk mills, hammer mills, and others. The term "milling" refers to the breaking of materials into smaller pieces in a mill. Milling techniques include, e.g., ball milling, rod milling, pebble milling, and vibratory ball milling. The term milling as used herein is also meant to encompass high speed shear stirring, colloid milling or passage through an orifice of a homogenizing valve at high pressure, for instance, 1,000 psig or greater. All of these produce milling conditions wherein heat is generated and materials are broken up into smaller pieces.

The term "heat of condensation" of gaseous substances, as used herein, refers to the quantity of heat (in Joules/gram of the gaseous substance) liberated by a gaseous substance at its boiling point as it condenses into a liquid. For example, the heat of condensation of water vapor is −2260 J/g, which means that 2260 J of energy are liberated when one gram of steam at 100° C. is condensed into one gram of liquid water at that temperature.

The term "evaporation" refers to the phase change of a liquid to a gas.

The term "gaseous substance" as used herein refers to a substance in its gaseous state, i.e., the state of matter in which the matter concerned if placed within a closed container occupies the whole of its container irrespective of its quantity. Gaseous substances given off during mixing and/or milling according to the methods described herein include water vapor (steam), and others.

The term "waste material," as used herein, refers to an unusable or unwanted material produced during or as a result of a process, such as metabolism or manufacturing. The term "waste," as used herein, includes, as typical examples, communal wastes, biological waste products such as raw human wastes, animal slaughter processing waste, animal food processing waste, petroleum waste, biomass, and moisture containing materials such as, e.g., chalk, fertilizing lime, and other materials containing substantial amounts of water.

It is to be understood that this invention is not limited to the particular methodology, protocols, constructs, and reagents described, as such may vary. It is also to be understood that the terminology used herein is for the purpose of describing particular embodiments only, and is not intended to limit the scope of the present invention which will be limited only by the appended claims.

What is claimed is:

1. A method of integrated waste material processing comprising: (a) mixing of a waste material with burnt lime, wherein said mixing results in an intermediate comprising from about 5% to about 50% by weight of lime hydrate, from about 2% to about 20% by weight of calcium oxide, from about 5% to about 60% by weight of solid matters, and from at most about 5% to at most about 90% by weight of water; and (b) milling said intermediate in a mill; wherein during said milling the temperature of said intermediate rises and an evaporation of water contained in said intermediate occurs.

2. The method of claim 1 wherein said mixing is performed in a process generator constituting an integral part of said mill.

3. The method of claim 1 wherein said mixing and said milling are performed in a single device.

4. The method of claim 1 wherein said burnt lime is in the form selected from the group of pellets and powder.

5. The method of claim 1 wherein said waste material is selected from the group of communal waste; animal slaughter processing waste; animal food processing waste; petroleum waste; biomass; chalk; and fertilizing lime.

6. The method of claim 1 wherein said burnt lime is ground burnt lime of high reactivity having $t_{60}$ between about 0.5 minutes and about 4 minutes.

7. The method of claim 1 wherein said mill is selected from the group of a ball mill, a rod mill, and a chainsaw mill.

8. The method of claim 1 wherein gaseous substances are emitted from said intermediate during the integrated processing of materials, said gaseous substances are condensed, and the heat of condensation of said gaseous substances is optionally used to heat the processed materials.

9. The method of claim 1 wherein said mixing and said milling occur simultaneously.

10. A method of integrated waste material processing comprising: (a) mixing of a waste material with a reactant able to undergo an exothermic hydration reaction with said waste material, wherein said mixing results in an intermediate comprising from about 5% to about 50% by weight of hydrated reactant, from about 2% to about 20% by weight of unreacted reactant, from about 5% to about 60% by weight of solid matters, and from at most about 5% to at most about 90% by weight of water; and (b) milling said intermediate in a mill; wherein during said milling the temperature of said intermediate rises and an evaporation of water contained in said intermediate occurs.

11. The method of claim 10 wherein said reactant is selected from the group of burnt lime, burnt dolomite, anhydrous calcium chloride, or combinations thereof.

12. The method of claim 10 wherein one or more gaseous substances are given off during said mixing and/or said milling; said gaseous substances are condensed; and the heat of condensation of said gaseous substances is used to heat said intermediate during said mixing and/or said milling.

13. The method of claim 10 wherein said mixing is performed in a process generator constituting an integral part of said mill.

14. The method of claim 10 wherein said mixing and said milling are performed in a single device.

15. The method of claim 10 wherein said reactant is in the form selected from the group of pellets and powder.

16. The method of claim 10 wherein said waste material is selected from the group of communal waste; animal slaughter processing waste; animal food processing waste; petroleum waste; biomass; chalk; and fertilizing lime.

17. The method of claim 10 wherein said reactant is of high reactivity having $t_{60}$ between about 0.5 minutes and about 4 minutes.

18. The method of claim 10 wherein said mill is selected from the group of a ball mill, a rod mill, and a chainsaw mill.

19. The method of claim 10 wherein said gaseous substances are emitted from said intermediate during the integrated processing of materials, said gaseous substances are condensed, and the heat of condensation of said gaseous substances is optionally used to heat the processed materials.

20. The method of claim 10 wherein said mixing and said milling occur simultaneously.

* * * * *